(12) United States Patent
Jeansonne et al.

(10) Patent No.: US 11,947,675 B2
(45) Date of Patent: Apr. 2, 2024

(54) RESTORATION OF FIRMWARE SUBSYSTEMS BASED ON MANUFACTURING STATES

(71) Applicant: Hewlett-Packard Development Company, L.P., Spring, TX (US)

(72) Inventors: Jeffrey Kevin Jeansonne, Spring, TX (US); Rosilet Retnamoni Braduke, Spring, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 337 days.

(21) Appl. No.: 17/052,970

(22) PCT Filed: Feb. 11, 2019

(86) PCT No.: PCT/US2019/017496
§ 371 (c)(1),
(2) Date: Nov. 4, 2020

(87) PCT Pub. No.: WO2020/167284
PCT Pub. Date: Aug. 20, 2020

(65) Prior Publication Data
US 2021/0357499 A1    Nov. 18, 2021

(51) Int. Cl.
*G06F 21/57* (2013.01)

(52) U.S. Cl.
CPC ............ *G06F 21/572* (2013.01); *G06F 21/57* (2013.01); *G06F 2221/034* (2013.01)

(58) Field of Classification Search
CPC .......................... G06F 21/572; G06F 2221/034
See application file for complete search history.

(56) References Cited

U.S. PATENT DOCUMENTS

| 8,286,093 B2 | 10/2012 | Martinez et al. |
| 10,055,296 B2 | 8/2018 | Su |
| 2004/0068334 A1 | 4/2004 | Tsai et al. |

(Continued)

FOREIGN PATENT DOCUMENTS

| CN | 102279914 | 12/2011 |
| WO | 2015/149020 A1 | 10/2015 |

*Primary Examiner* — David J Pearson
(74) *Attorney, Agent, or Firm* — Knobbe, Martens, Olson & Bear, LLP

(57) ABSTRACT

An example computing device incudes a main processor, a management firmware subsystem, and a controller to control operation of the management firmware subsystem. The controller is separate from a main processor. A memory stores subsystem data that is useable by the controller. The computing device further includes a set of instructions that determines a manufacturing mode of the computing device. The manufacturing mode is enabled when the computing device is under manufacture or maintenance. The manufacturing mode is disabled when the computing device is under normal operation. The set of instructions further determines a manufacturing state of the subsystem data. The manufacturing state indicates whether the subsystem data is complete. In response to determining that the manufacturing mode is disabled and that the manufacturing state of the subsystem data is incomplete, the set of instructions initiates a restoration of the subsystem data from a backup of the subsystem data.

18 Claims, 4 Drawing Sheets

(56) References Cited

U.S. PATENT DOCUMENTS

| | | |
|---|---|---|
| 2009/0094421 A1* | 4/2009 | Lewis .................... G06F 21/78 |
| | | 711/E12.091 |
| 2010/0169630 A1 | 7/2010 | Mirashrafi et al. |
| 2016/0055068 A1* | 2/2016 | Jeansonne ............ G06F 21/572 |
| | | 714/15 |
| 2016/0055338 A1* | 2/2016 | Jeansonne .............. G06F 21/56 |
| | | 726/1 |
| 2016/0063255 A1 | 3/2016 | Jeansonne et al. |
| 2017/0123927 A1* | 5/2017 | Su ........................ G06F 9/4403 |
| 2018/0088963 A1 | 3/2018 | Arora et al. |
| 2018/0096154 A1 | 4/2018 | Shivanna et al. |

* cited by examiner

RESTORATION OF FIRMWARE SUBSYSTEMS BASED ON MANUFACTURING STATES

BACKGROUND

Computing devices, such as desktop computers, notebook computers, servers, tablet computers, and smartphones, often include firmware stored in non-volatile memory. When a computing device is booted, the firmware may initialize hardware of the computing device and start runtime services that may be used by an operating system or application executed by the computing device.

Various mechanisms may be provided to firmware to mitigate erroneous or unauthorized modification, which could allow a malicious person or program to take control of a computing device, render a computing device inoperable, or similar.

DETAILED DESCRIPTION

Figure 1:
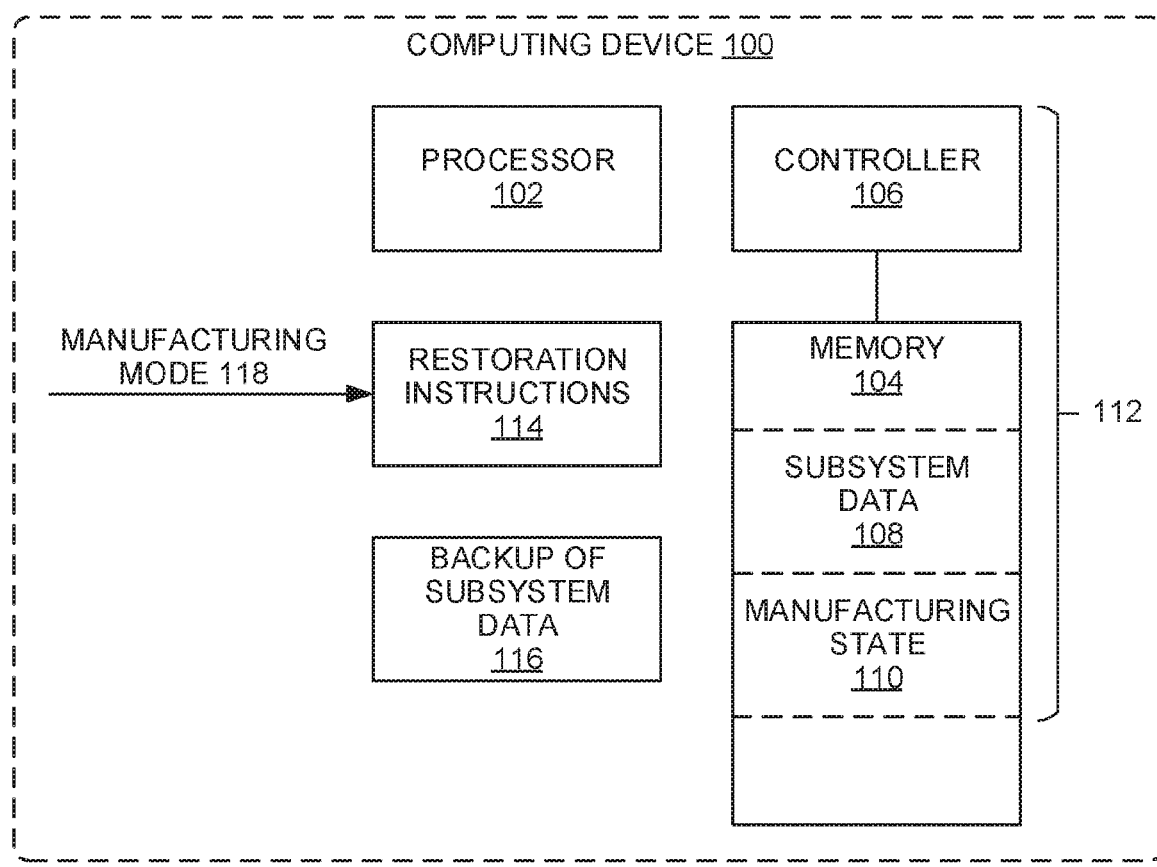
FIG. 1 is a block diagram of an example computing device including a firmware subsystem that includes subsystem data that may be restored based on manufacturing information.

A computing device may be manufactured from different components provided by different parties. For example, a central processing unit (CPU), a platform control chipset, baseboard or motherboard, firmware, memory, and so on may be made by different companies.

It may be the case that a component contains proprietary information. For example, a component that provides management functions to a computing device, such as remote management services, may contain information that the provider of the component wishes to keep obscure or secret for security or other reasons. Such a component may be provided as an autonomous management firmware subsystem, in the form of a chipset or system-on-chip, that is separate from a main processor (e.g., CPU) of a computing device. An example of such a management firmware subsystem may include a subsystem controller and a subsystem data accessible to the subsystem controller. A subsystem controller may execute a program defined by the subsystem data to carry out the functions of the subsystem. Example management firmware subsystem functions include boot protection, remote access or management services, monitor/control of device physical properties (e.g., cooling fan speed, CPU/motherboard temperature, CPU/motherboard voltage, etc.), network functionality, security functionality, copy protection, digital rights management, and similar.

Management firmware may be separate and distinct from hardware-initialization firmware, such as Basic Input/Output System (BIOS) firmware and Unified Extensible Firmware Interface (UEFI) firmware. A management firmware subsystem may be autonomously executed by a dedicated controller rather than by the CPU or main processor. Hardware-initialization firmware may be executed by the same main processor that executes an operating system and applications. A main processor may not be able to have access to a memory device or partition that stores a management firmware subsystem. While hardware-initialization firmware and a management firmware subsystem are separate and distinct, there may be overlap in functionality.

Backup and restoration of subsystem data may allow for recovery from intrusion, disaster, or other event that affects a computer system. However, backup and restoration of subsystem data may be confounded by the proprietary nature of a management firmware subsystem.

Manufacturing information of a computing device may be referenced to back up and restore a management firmware subsystem. For example, during manufacture or maintenance of a computing device, the device may be placed in a manufacturing mode. A firmware subsystem may include a manufacturing state, that is, state information indicative of whether subsystem data is complete or incomplete. When the manufacturing state is set to incomplete, the subsystem may allow for the setting of one-time-programmable memory or fuses, as is expected during manufacture. When the manufacturing state is set to complete, the subsystem may mitigate modification of programmable memory, such as one-time-programmable memory, and may block access to secure memory. As such, the manufacturing state may guard against unintended or unauthorized modification of or access to the management firmware subsystem.

The subsystem's data may be backed up when the management firmware subsystem state is complete and when the computing device is in the manufacturing mode, as a manufacturing environment or authorized maintenance event is sufficiently secure for this purpose. Later, when the computing device is with an end user in normal operation, the manufacturing mode of the computing device and the manufacturing state of the management firmware subsystem may be referenced to trigger a restoration of the backup of the management firmware subsystem. For example, an unauthorized program or user may attempt to put the management firmware subsystem back into the manufacturing state in an attempt to modify the subsystem. However, the manufacturing mode of the computing device may remain disabled in contradiction to the manufacturing state of the management firmware subsystem. Detection of the management firmware subsystem's manufacturing state as incomplete when the manufacturing mode of the computing device is disabled may therefore trigger a restoration of the backup of the management firmware subsystem to hinder or mitigate modification of the management firmware subsystem. Hence, the manufacturing mode of the computing device may be used as a guard against error or unauthorized modification of the management firmware subsystem.

FIG. 1 shows an example computing device 100. The computing device 100 may be a desktop computer, server, notebook computer, tablet computer, smartphone, or similar device.

The computing device 100 includes a main processor 102, memory 104, and a controller 106. The computing device 100 may include other components, not illustrated for sake of clarity, such as a user interface device (e.g., keyboard, display, touchscreen, etc.), mass storage device (e.g., hard drive, solid-state drive, etc.), power supply, and the like.

The main processor 102 may be referred to as a CPU and may execute hardware-initialization firmware (e.g., BIOS, UEFI), an operating system, and application programs.

The memory 104 is a non-transitory computer-readable medium that includes non-volatile memory, such as Electrically Erasable Programmable Read-Only Memory (EEPROM), flash memory, or similar type of memory that is capable of preserving content without external power. The memory 104 stores subsystem data 108 and a manufacturing state 110 of the subsystem data 108. The memory 104 may also store hardware-initialization firmware or other information.

The controller 106 may be a microcontroller, microprocessor, or similar device. The controller 106 is separate from the main processor 102. The controller 106 and processor 102 may have different architectures and different instruction sets. In some examples, the controller 106 has less capability than the main processor 102.

The controller 106 and the main processor 102 execute respective sets of instructions separately. Instruction execution by the controller 106 and the main processor 102 may occur at different times or simultaneously. The controller 106 may operate autonomously from the main processor 102. For example, the controller 106 may operate normally when the main processor 102 is in a sleep mode or hibernate mode or is off.

Access by the main processor 102 to instructions intended for the controller 106 may be mitigated by restricting access to a portion of the memory where the instructions intended for the controller 106 are stored. This may be achieved by a descriptor or partition table of the memory 104 that the main processor 102 refers to when accessing the memory 104.

The controller 106, subsystem data 108, and manufacturing state 110 may form a management firmware subsystem 112 whose operation is controlled by the controller 106. The management firmware subsystem 112 may be an autonomous management firmware subsystem. The subsystem data 108 may include a set of subsystem instructions executable by the controller 106 to implement the functionality of the management firmware subsystem 112 as well as supporting data. For example, the subsystem data 108 may include a set of subsystem instructions that implements a remote management service, which allows an organization to remotely manage a large number of computing devices 100, or any of the other example functionality described herein with respect to a management firmware subsystem.

The manufacturing state 110 indicates whether the subsystem data 108 is complete or incomplete. At time of manufacture, the subsystem data 108 may be installed and configured, and the manufacturing state 110 is set once this is complete. The manufacturing state 110 may be referred to as an end-of-manufacture (EoM) state. The manufacturing state 110 may be a value that is stored in memory 104 and that is set upon complete installation of the firmware subsystem data 108. The manufacturing state 110 is exposed to outside the management firmware subsystem 112, such as to the main processor 102.

The computing device 100 further includes a set of restoration instructions 114 and a backup 116 of the subsystem data 108. The restoration instructions 114 and the subsystem data backup 116 may be stored in a non-volatile memory of the computing device 100, such as memory 104. The restoration instructions 114 may be executable by the main processor 102 or a by different processor/controller of the computing device 100.

The subsystem data backup 116 is a copy of some or all of the subsystem data 108. The subsystem data backup 116 may be captured at time of manufacture of the computing device 100, as will be discussed in greater detail below.

The set of restoration instructions 114 uses the subsystem data backup 116 to restore the subsystem data 108 to the memory 104 to correct for error, intrusion, or other event that may affect the subsystem data 108. To do this, the restoration instructions 114 determine whether the computing device 100 is in a manufacturing mode 118 and further determines the manufacturing state 110 of the management firmware subsystem 112.

The manufacturing mode 118 of the computing device 100 may be enabled or disabled. The manufacturing mode 118 is enabled when the computing device is under manufacture or maintenance. The manufacturing mode 118 is disabled when manufacture or maintenance is complete and the computing device 100 is to be used under normal operation by an end user. The manufacturing mode 118 may be controlled by hardware-initialization firmware, a security controller, or similar. Changing the manufacturing mode 118 may require providing an access credential, such as a password, digital certificate, or similar. Changing the manufacturing mode 118 may require performing a physical action with the computing device 100, such as disconnecting and reconnecting a power adaptor, flipping a switch, pressing a keyboard key, pressing a reset button, or similar.

The set of restoration instructions 114 initiates a restoration of the subsystem data 108 from the subsystem data backup 116 in response to determining that the manufacturing mode 118 is disabled and that the manufacturing state 110 of the subsystem data 108 is incomplete. Hence, if a malicious user or program or an error changes the manufacturing state 110 of the subsystem, this triggers the restoration of the subsystem data 108 from backup, so as to reduce or eliminate the risk of modification or manipulation of the subsystem data 108 allowed by the manufacturing state 110.

In response to initiation of the restoration of the subsystem data 108 from the subsystem data backup 116, the backup 116 copied into the memory 104 to replace the version present. The manufacturing state 110 is then set to complete.

Figure 2:
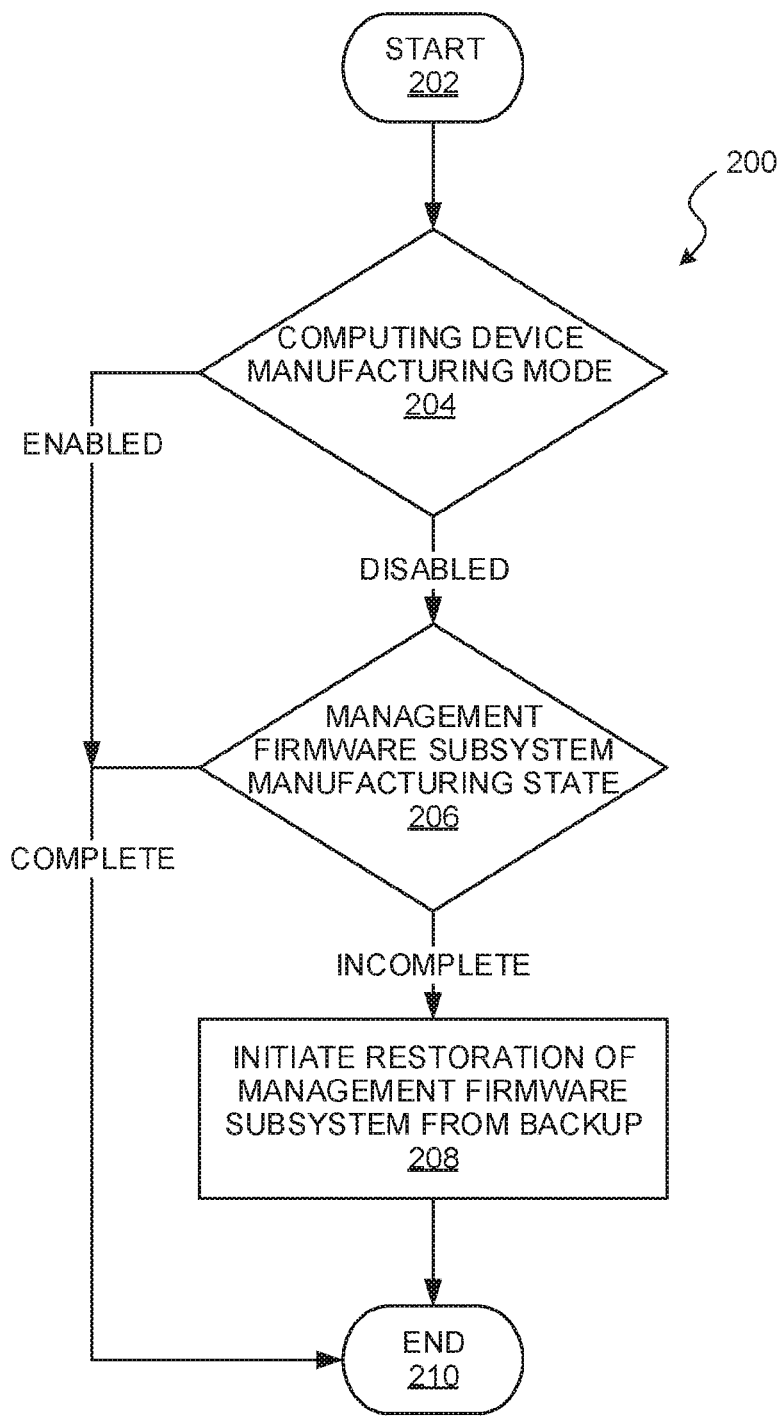
FIG. 2 is a flowchart of an example method to restore firmware subsystem data based on manufacturing information.

FIG. 2 shows an example method 200 to restore firmware subsystem data based on manufacturing information. The method 200 may be performed by any of the devices and systems described herein. The method 200 may be embodied by a set of executable instructions that may be stored in a non-transitory computer-readable medium. The method begins at block 202.

At block 204, a manufacturing mode of a computing device is determined. The manufacturing mode may be used to allow for access to protected areas of memory. The manufacturing mode is enabled when the computing device is under manufacture or maintenance and disabled when the computing device is under normal operation. If the manufacturing mode of the computing device is enabled, then the method 200 ends and the computing device is considered to be in a controlled environment, such as a manufacture or repair environment, where firmware modification may be permitted. If the manufacturing mode is disabled, then the computing device is considered to be deployed and at risk to unauthorized or erroneous firmware modification and, thus, a manufacturing state of the firmware subsystem is checked.

At block 206, the manufacturing state of a firmware subsystem of the computing device is determined. The manufacturing state indicates whether the firmware subsystem is complete. For example, a firmware program and relevant data may be installed to a non-volatile memory of the firmware subsystem. The manufacturing state of the firmware subsystem may therefore indicate the completeness of such installation. If the manufacturing state is complete, then the method 200 ends at block 210.

If the manufacturing state is incomplete, then an unauthorized or erroneous firmware modification is detected and, at block 208, the method triggers restoration of a backup of the firmware subsystem in response. In effect, an unauthorized or unexpected change in the manufacturing state of the firmware subsystem is guarded against by the manufacturing mode of the computing device.

The checks of blocks 204, 206 may be performed in any order or may be performed simultaneously. The method 200 may be performed during boot of the computing device, during normal operation of the computing device, or during both boot and normal operation. After restoration of the backup, the manufacturing state is set to complete.

Figure 3:
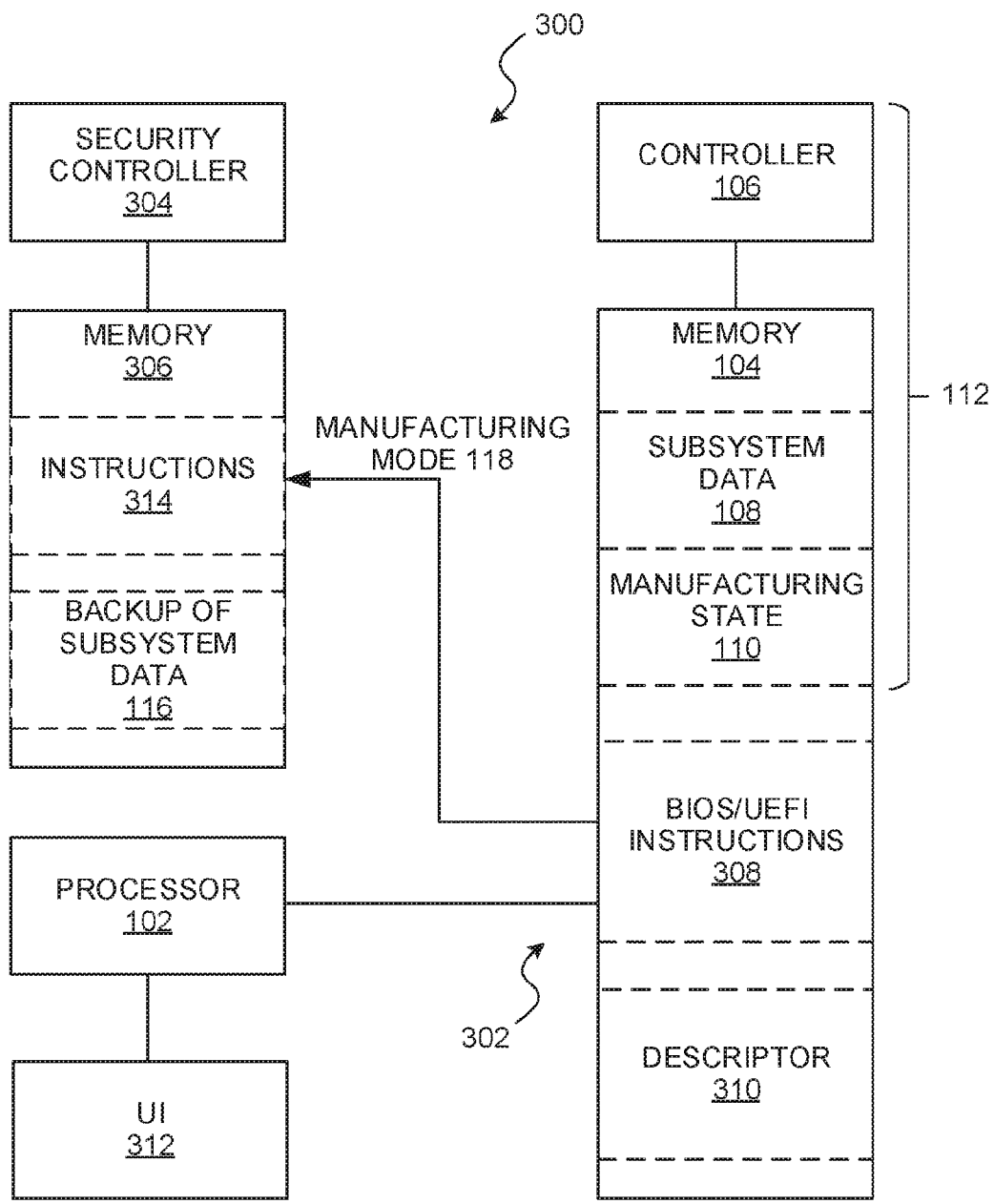
FIG. 3 is a block diagram of an example computing device including a firmware subsystem that includes subsystem data that may be backed up and then restored based on manufacturing information.

FIG. 3 shows another example computing device 300. Features and aspects of the other devices and systems described herein can be used with the computing device 300. Like numerals identify like components and redundant description is omitted for sake of clarity.

The computing device 300 includes a main processor 102, non-volatile memory 104, a management firmware subsystem 112, a hardware-initialization firmware subsystem 302, a security controller 304, and secure memory 306.

The management firmware subsystem 112 includes a firmware controller 106 and a portion of the memory 104. Data 108 of the management firmware subsystem 112 stored in memory 104 may include a program and related data. Further, a manufacturing state 110 that indicates whether the management firmware subsystem 112 is completely installed and configured may also be stored in memory 104. The management firmware subsystem 112 may provide security and management functions to the computing device 300, such as remote management services, remote wipe, encryption, digital rights management, and similar.

The hardware-initialization firmware subsystem 302 includes instructions 308 stored in the memory 104 and executable by the main processor 102. The instructions 308 may perform a hardware initialization, test hardware components, load a boot loader from a mass storage to initialize an operating system, provide runtime services to an operating system or application, and provide similar functions to the computing device 300.

The hardware-initialization firmware subsystem 302 provides a manufacturing mode 118 that may allow for hardware diagnostics and memory access not intended for normal use. The manufacturing mode 118 is enabled when the computing device 300 is under manufacture or maintenance and is disabled when the computing device 300 is under normal operation.

Access to the memory 104 may be controlled by a descriptor 310 stored in the memory 104. The descriptor 310 may define a region of memory 104 available to the management firmware subsystem 112 and inaccessible to the main processor 102 or security controller 304. The descriptor 310 may be an SPI descriptor, a partition table, or similar.

The security controller 304 may provide security functions to the computing device 300 and specifically to the memory 104. The security controller 304 may monitor the memory 104 and detect unauthorized or erroneous modification to content of the memory 104. For example, the security controller 304 may detect and halt an attempt to overwrite boot information of the hardware-initialization instructions 308.

The security controller 304 and the hardware-initialization firmware subsystem 302 may communicate, for example, by message passing or other mechanism.

The management firmware subsystem data 108 may be inaccessible to the security controller 304 due to the descriptor 310, as the management firmware subsystem 112 may include proprietary or secret information and/or functionality. Further, the management firmware subsystem 112 may have an internal verification process to detect and halt an unauthorized or erroneous modification to the subsystem data 108.

The manufacturing state 110 is available to the security controller 304, so that the security controller 304 may determine whether the management firmware subsystem 112 is complete or incomplete. The manufacturing state 110 may be directly available to the security controller 304 or may be available to the main processor 102, through execution of the hardware-initialization instructions 308, and provided by the hardware-initialization instructions 308 to the security controller 304. As such, the security controller 304 is able to determine the apparent manufacturing state of the management firmware subsystem 112.

The secure memory 306 is connected to the security controller 304 and may store instructions and data for use by the security controller 304. The secure memory 306 is a non-transitory computer-readable medium that includes non-volatile memory, such as EEPROM, flash memory, or similar type of memory that is capable of preserving content without external power. The secure memory 306 may store a set of instructions 314 executable by the security controller 304 to determine the manufacturing mode 118 of the computing device 300 and the manufacturing state of the management firmware subsystem 112 and restore a backup 116 of the firmware subsystem under certain conditions.

The instructions 314 may trigger restoration of the backup 116 of the management firmware subsystem 112 in response to determining that the manufacturing mode 118 is disabled and that the state 110 of the firmware subsystem is incomplete. That is, restoration of the management firmware subsystem 112 is triggered when the management firmware subsystem 112 is vulnerable to modification but the computing device 300 indicates that manufacture/maintenance is not occurring.

The descriptor 310 may be temporarily modified or ignored to allow copying of the backup 116 into the memory 104.

The computing device 300 may further include a user interface 312, which may include a keyboard, mouse, trackpad, display, speaker, or similar component. The user interface 312 may be coupled to the main processor 102. The instructions 314 may further generate an indication of an intrusion to the subsystem data 108 when the backup restoration conditions are met. An example intrusion indication is a text string displayed to the user or saved in a log. As such, a user may be made aware of the potential intrusion and resulting restoration of the backup 116.

The instructions 314 may further generate the backup 116 of the management firmware subsystem data 108 and store the backup 116 of the management firmware subsystem in the secure memory 306 in response to detecting that the manufacturing state 110 of the management firmware subsystem data 108 is complete and that the backup 116 is not available. That is, an initial backup 116 of the management firmware subsystem data 108 may be captured based on a transition of the manufacturing state 110 from incomplete to complete. This represents that the management firmware subsystem data 108 has completed installation. The generation of the backup 116 may further be conditional on the manufacturing mode 118 being enabled.

Figure 4:
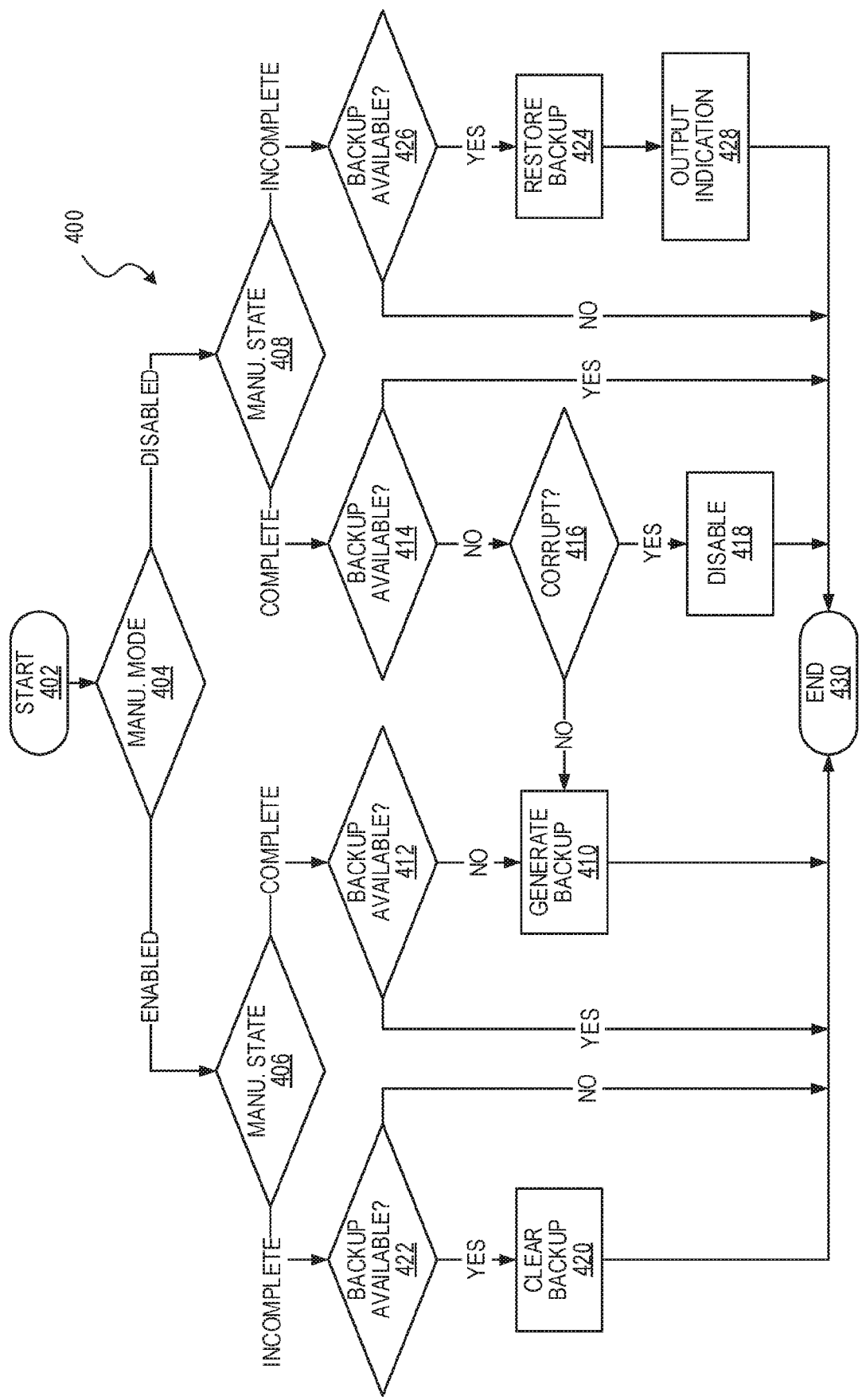
FIG. 4 is a flowchart of an example method to backup and restore firmware subsystem data based on manufacturing information.

FIG. 4 is a flowchart of an example method 400 to backup and restore a management firmware subsystem based on manufacturing information. The method 400 may be performed by any of the devices and systems described herein. The method 400 may be embodied by a set of executable instructions that may be stored in a non-transitory computer-readable medium, where such instructions may be executable by an security controller. The method begins at block 402.

Blocks 404 and 406/408 define a plurality of decision paths based on, respectively, a manufacturing mode of a computing device and a manufacturing state of a management firmware subsystem of the computing device. Under normal use, the manufacturing mode is used during initial manufacture and authorized maintenance of the computing device and the manufacturing state is set to indicate complete upon successful installation of the management firmware subsystem during manufacture or maintenance. The management firmware subsystem may then be backed up. Change of the manufacturing state of the management firmware subsystem at other times may indicate unauthorized or erroneous modification (or attempted modification) of the management firmware subsystem, in which case the backup may be restored to override any unauthorized or erroneous modification.

At block 410, a backup of the management firmware subsystem is generated in response to the manufacturing mode being enabled and the manufacturing state of the management firmware subsystem being complete. This represents the management firmware subsystem completing installation and configuration at time of manufacture or maintenance. As such, a backup of the completed state is captured. Block 412 may impose the condition that a backup is not yet available to avoid multiple or redundant captures.

When the manufacturing mode of the computing device is disabled and the manufacturing state of the management firmware subsystem is complete, the method 400 ends via block 414 when a backup is available. This path represents normal operation of the computing device after manufacture or maintenance.

If the backup is unavailable and the management firmware subsystem is corrupted, via block 416, then restoration of the management firmware subsystem is disabled, at block 418. This may signify a problem with the computing device or firmware, such as a failed or erroneous capture of the management firmware from an external source. If the management firmware subsystem is not corrupted, then the backup may be captured at block 410.

At block 420, the backup of the management firmware subsystem may be cleared in response to determining that the manufacturing mode is enabled and that the manufacturing state of the management firmware subsystem is incomplete. For example, at time of manufacture or maintenance, the management firmware subsystem may be modified and, as such, a former backup may be deleted. Block 422 may impose the condition that a backup is available to be cleared. The path through block 420 may be used to clear an out-of-date backup when the management firmware is being updated.

At block 424, restoration of the management firmware subsystem from the backup is initiated in response to determining that the manufacturing mode is disabled and that the manufacturing state of the management firmware subsystem is incomplete. Block 426 may impose the condition that a backup is available to restore. In addition, an indication of the detection of this path and/or the restoration of the firmware, such as a user interface message or log message, may be made, at block 428. This path represents an unauthorized or erroneous attempted or actual modification to the management firmware subsystem that includes the manufacturing state of the management firmware subsystem being changed. Hence, the backup is restored to preclude the modification. After restoration of the backup, the manufacturing state is set to complete.

The method 400 ends at block 430. The checks of blocks 404, 406/408, and 412/414/422/426 may be performed in any order or may be performed simultaneously. The method 400 may be performed during boot of the computing device, during normal operation of the computing device, or during both boot and normal operation. The end block 430 may trigger a system reboot so that changes to manufacturing mode and manufacturing state can be effected and reevaluated during a subsequent performance of the method 400.

In an example scenario, a computing device under manufacture has a manufacturing mode enabled with the manufacturing state of the management firmware subsystem being incomplete. The method 400 proceeds to through block 422 to end at block 430. At a subsequent time, the management firmware subsystem is completely installed and configured and the manufacturing state is set to complete. Transition of the manufacturing state from incomplete to complete may trigger a reboot of the computing device. The computing device reboots and the method 400 proceeds to through blocks 412, 410 to capture a backup of the management firmware. Manufacture is completed and the manufacturing mode is disabled. During normal use; the method 400 proceeds through block 414, to confirm that the backup of the management firmware subsystem remains available, and ends at block 430. During normal use, if the manufacturing state of the management firmware subsystem is changed to incomplete, then the method restores the backup at block 424 and provides an indication of possible intrusion or error at block 428.

In view of the above, it should be apparent that a firmware backup may be captured and restored based on manufacturing information. A manufacturing mode of a computing device may guard against malicious or inadvertent modification of a management firmware subsystem. Further, an intrusion may be detected and alerted. Attacks, such as a default image replacement attack, may be stopped.

It should be recognized that features and aspects of the various examples provided above can be combined into further examples that also fall within the scope of the present disclosure. In addition, the figures are not to scale and may have size and shape exaggerated for illustrative purposes.

The invention claimed is:

1. A computing device comprising:
 a main processor to execute firmware, wherein the firmware includes a manufacturing mode of the computing device, wherein the manufacturing mode is enabled when the computing device is under manufacture or maintenance, and wherein the manufacturing mode is disabled when the computing device is under normal operation; and
 a management firmware subsystem to execute subsystem instructions distinct from the firmware, wherein the management firmware subsystem includes:
  a memory region accessible to the management firmware subsystem and inaccessible to the main processor, wherein the memory region is to store:
   subsystem data that includes the subsystem instructions, and
   a manufacturing state of the management firmware subsystem, wherein the manufacturing state is complete when installation of the subsystem data in the memory region is complete, and wherein the manufacturing state is incomplete when the management firmware subsystem is allowing installation of subsystem data to the memory region; and a controller in communication with the memory, wherein the controller is to:
   determine the manufacturing mode of the computing device,
   determine the manufacturing state of the subsystem data,
   in response to a request to access the management firmware subsystem, determine whether there is a contradiction between the manufacturing mode of the computing device and the manufacturing state of the management firmware subsystem,
   if there is a contradiction between the manufacturing mode of the computing device and the manufacturing state of the management firmware subsystem, initiate a restoration of the subsystem data from a backup of the subsystem data, and
   if there is not a contraction between the manufacturing mode of the computing device and the manufacturing state of the management firmware subsystem, confirm availability of the backup of the subsystem data.

2. The computing device of claim 1, wherein:
the controller determines the manufacturing mode of the computing device is disabled and the manufacturing state of the management firmware subsystem is incomplete,
the controller determines there is a contradiction between the manufacturing mode and the manufacturing state, and
the controller initiates restoration of the subsystem data from the backup of the sub system data.

3. The computing device of claim 2, wherein the controller is further to generate an indication of an intrusion to the subsystem data.

4. The computing device of claim 1, wherein:
the controller determines the manufacturing mode of the computing device is enabled and the manufacturing state of the subsystem data is complete,
the controller determines there is not a contradiction between the manufacturing mode and the manufacturing state,
the controller confirms the backup of the subsystem data is not available, and
the controller is further to generate the backup of the subsystem data.

5. The computing device of claim 1, wherein:
the controller determines the manufacturing mode of the computing device is disabled and the manufacturing state of the subsystem data is complete,
the controller determines there is not a contradiction between the manufacturing mode and the manufacturing state,
the controller confirms the backup of the subsystem data is not available, and
the controller is to:
   determine that the subsystem data is corrupted, and disable restoration of the sub system data.

6. The computing device of claim 1, wherein:
the controller determines the manufacturing mode of the computing device is enabled and the manufacturing state of the subsystem data is incomplete,
the controller determines there is a not contradiction between the manufacturing mode and the manufacturing state,
the controller confirms the backup of the subsystem data is available, and
the controller is to clear the backup of the subsystem data.

7. The computing device of claim 1, wherein the subsystem data is unusable by the main processor of the computing device.

8. The computing device of claim 1, further comprising:
a security controller that monitors the memory to detect unwanted modification to the subsystem data.

9. A non-transitory computer-readable medium storing computer-executable instructions, that when executed by a processor of a computing device, cause the processor to:
   determine a manufacturing mode of the computing device, wherein the manufacturing mode is enabled when the computing device is under manufacture or maintenance, and wherein the manufacturing mode is disabled when the computing device is under normal operation;
   determine a manufacturing state of a management firmware subsystem of the computing device, wherein the manufacturing state is complete when installation of the management firmware subsystem is complete, and wherein the manufacturing state is incomplete when installation of the management firmware subsystem is allowed; and
   in response to a request to access the management firmware subsystem, determine whether there is a contradiction between the manufacturing mode of the computing device and the manufacturing state of the management firmware subsystem, and
   if there is a contradiction between the manufacturing mode of the computing device and the manufacturing state of the management firmware subsystem, initiate a restoration of the management firmware subsystem from a backup of the management firmware subsystem, and
   if there is not a contradiction between the manufacturing mode of the computing device and the manufacturing state of the management firmware subsystem, confirm availability of the backup of the management firmware subsystem.

10. The non-transitory computer-readable medium of claim 9, wherein the processor that executes the computer-executable instructions comprises at least one of a main processor, a firmware controller, or a security controller.

11. The non-transitory computer-readable medium of claim 9, wherein:
the processor is caused to determine the manufacturing mode of the computing device is disabled and the manufacturing state of the management firmware subsystem is incomplete,
the processor is caused to determine there is a contradiction between the manufacturing mode and the manufacturing state, and
the processor is caused to initiate restoration of the management firmware subsystem from the backup of the management firmware subsystem.

12. The non-transitory computer-readable medium of claim 11 storing further computer-executable instructions that, when executed by the processor, cause the processor to generate an indication of an intrusion to the management firmware subsystem.

13. The non-transitory computer-readable medium of claim 9, wherein:

the processor is caused to determine the manufacturing mode of the computing device is enabled and the manufacturing state of the management firmware subsystem is complete, the processor is caused to determine there is not a contradiction between the manufacturing mode and the manufacturing state, the processor is caused to confirm the backup of the management firmware subsystem is not available, and the non-transitory computer-readable medium stores further computer-executable instructions that, when executed by the processor, cause the processor to generate the backup of the management firmware subsystem.

14. The non-transitory computer-readable medium of claim 9, wherein the computer-executable instructions, when executed by the processor:

determine the manufacturing mode of the computing device is disabled and the manufacturing state of the management firmware subsystem is complete, determine there is not a contradiction between the manufacturing mode and the manufacturing state, confirm the backup of the management firmware subsystem is not available, determine that the management firmware subsystem is corrupted, and disable the restoration of the management firmware subsystem.

15. The non-transitory computer-readable medium of claim 9, wherein:

the processor determines the manufacturing mode of the computing device is enabled and the manufacturing state of the management firmware subsystem is incomplete, the processor determines there is a not contradiction between the manufacturing mode and the manufacturing state, the processor confirms the backup of the management firmware subsystem is available, and the non-transitory computer-readable medium stores further computer-executable instructions that, when executed by the processor, cause the processor to clear the backup of the management firmware subsystem.

16. A computing device comprising:

a main processor;

a hardware-initialization firmware subsystem, wherein the hardware-initialization firmware subsystem includes:

hardware-initialization instructions executable by the main processor, and a manufacturing mode of the computing device, wherein the manufacturing mode is enabled when the computing device is under manufacture or maintenance, and wherein the manufacturing mode is disabled when the computing device is under normal operation;

a management firmware subsystem distinct from the hardware-initialization firmware subsystem, wherein the management firmware subsystem includes:

a firmware controller; and a memory region accessible to the management firmware subsystem and inaccessible to the main processor, wherein the memory region is to store:

management firmware subsystem instructions executable by the firmware controller, management firmware subsystem data of the management firmware subsystem, and a manufacturing state of the management firmware subsystem, wherein the manufacturing state is complete when installation of the management firmware subsystem instructions and the management firmware subsystem data in the memory region is complete, and wherein the manufacturing state is incomplete when the management firmware subsystem is allowing installation of the management firmware subsystem instructions and the management firmware subsystem data to the memory region; and a security controller to:

determine the manufacturing mode of the computing device, determine the manufacturing state of the management firmware subsystem, in response to a request to access the management firmware subsystem, determine whether there is a contradiction between the manufacturing mode of the computing device and the manufacturing state of the management firmware sub system, if there is a contradiction between the manufacturing mode of the computing device and the manufacturing state of the management firmware subsystem, initiate a restoration of a backup of the management firmware subsystem, and if there is not a contraction between the manufacturing mode of the computing device and the manufacturing state of the management firmware subsystem, confirm availability of the backup of the management firmware subsystem.

17. The computing device of claim 16, further comprising a secure memory in communication with the security controller, wherein the security controller is further to generate the backup of the management firmware subsystem and store the backup of the management firmware subsystem in the secure memory.

18. The computing device of claim 16, wherein:

the security controller determines the manufacturing mode of the computing device is disabled and the manufacturing state of the management firmware subsystem is incomplete, the security controller determines there is a contradiction between the manufacturing mode and the manufacturing state, and the security controller initiates restoration of the management firmware subsystem from the backup of the management firmware subsystem.

* * * * *